T. J. SLOAN.
Apparatus for Thawing Frozen Water-Pipes.
No. 168,352. Patented Oct. 5, 1875.
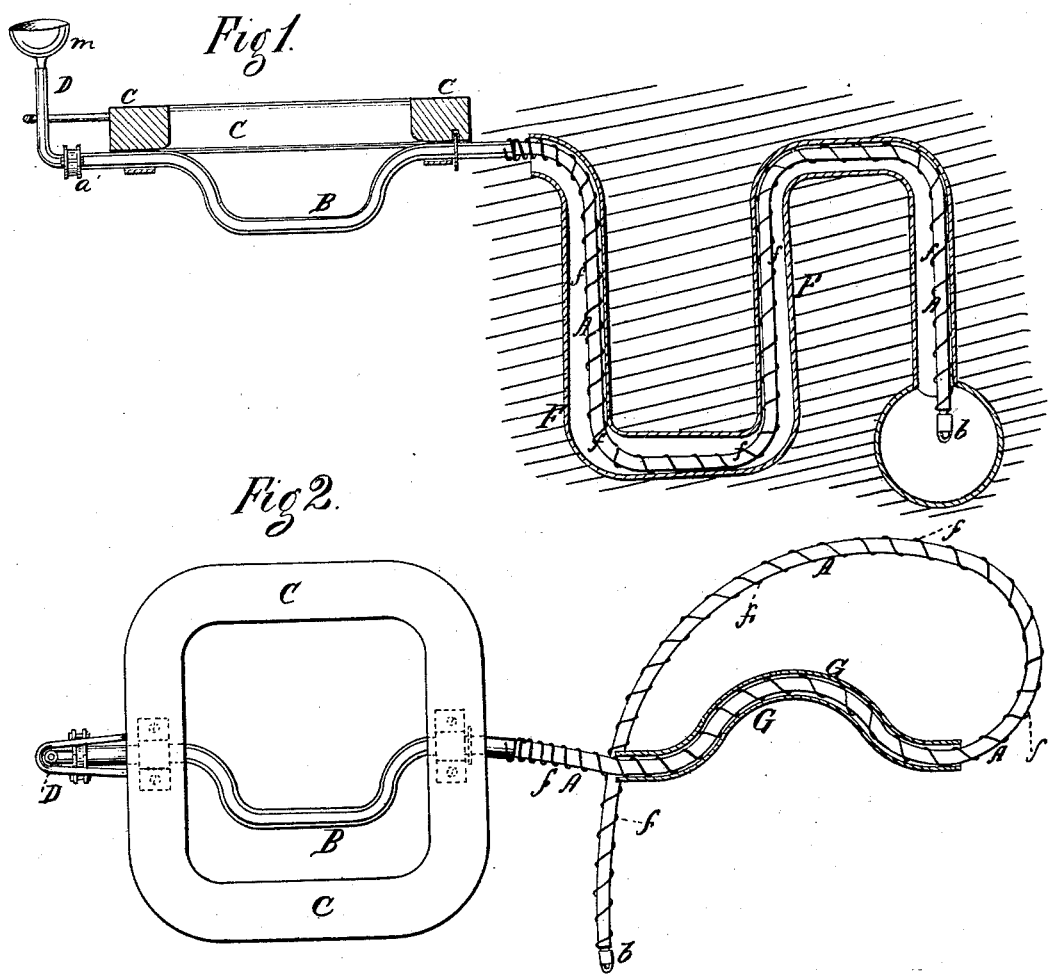
Witnesses.
W. M. Edwards.
James A. Whitney.
Inventor.
Thos. J. Sloan

UNITED STATES PATENT OFFICE.

THOMAS J. SLOAN, OF NEW YORK, N. Y.

IMPROVEMENT IN APPARATUS FOR THAWING FROZEN WATER-PIPES.

Specification forming part of Letters Patent No. 168,352, dated October 5, 1875; application filed March 17, 1875.

*To all whom it may concern:*

Be it known that I, THOMAS J. SLOAN, of the city, county, and State of New York, have invented an Improvement in Apparatus for Thawing Frozen Water-Pipes, of which the following is a specification:

This invention is designed for thawing frozen water-pipes under those conditions where a simple thrust exerted upon the tubular conduit used to convey a heated fluid into the pipe, to thaw the ice therein, will not suffice to force the said conduit through extreme lengths of water-pipe, or through inordinate sinuosities at acute angles therein.

To provide an apparatus fitted for use in such cases my invention consists in a flexible pipe, constructed with a suitable outlet-nozzle, and having a spiral or screw thread formed upon its outer surface by means of a wire appropriately coiled on the said pipe, so that when the nozzle is inserted in the water-pipe to be thawed, and an axial or rotatory motion given to the aforesaid flexible pipe, the latter will screw itself along to bring the nozzle in due contact or relation with the ice to be melted or thawed, so that the heated fluid issuing from the nozzle will secure the result just indicated.

The invention further comprises the combination of a crank with the externally screw-threaded flexible pipe, whereby the rotatory movement requisite to the operation of the same may be readily given thereto.

The invention further comprises the combination of a supplemental tubular crank with the aforesaid flexible pipe, said crank being arranged to slide upon the pipe, so as to be adjustable to any point along the length thereof, and capable of being worked close to the orifice of the water-pipe to be thawed, to secure a more efficient turning of the flexible pipe.

Figure 1 is a side view and partial section of an apparatus made according to my invention, and Fig. 2 is a plan view of the same.

A is a flexible pipe, of rubber or other material, furnished at its outer end with a rounded metallic nozzle, $b$, and connected at its inner end with a tubular crank, B, working in suitable journals in a frame, C, the opposite end of said crank being connected by a swiveled joint, $a'$, with an upright tube, D, into which hot water may be poured by means of a funnel shown at $m$. A screw-thread is formed externally upon the pipe A by means of a wire, $r$, having sufficient pitch or interspace between its coils, and snugly wound upon the pipe aforesaid.

In using the apparatus the nozzle end of the pipe A is thrust into the water-pipe to be thawed, and, a rotatory movement being given to the crank B, the tube is rotated around its axis, and, by means of its external thread $f$, formed, as hereinbefore set forth, of a wire wound spirally around the said pipe, is screwed into the water-pipe shown at F, with its nozzle bearing against, or close to, the ice within to be removed, so that hot water being poured into the pipe through the funnel is caused to impinge against the ice, to thaw the same, the screwing movement of the flexible spirally-threaded pipe enabling the nozzle to be kept in due relation to the ice to be thawed. As the rotation of the flexible pipe, when the latter is of considerable length, may be materially assisted by power applied close to the throat or opening of the water-pipe into which the flexible pipe is thrust, a tubular crank, G, is placed upon the latter in such manner as to be capable of longitudinal movement thereon, and, consequently, adjustable to any desired place along the length thereof.

It is preferred to use this crank G as supplemental to the crank B; but, if preferred, it may be arranged to provide wholly for the requisite rotation of the pipe A in the insertion and progress of the same to and in the water-pipe to be thawed, and also in the withdrawal thereof by a reverse motion of the crank.

What I claim as my invention is—

1. As a new article of manufacture, a flexible pipe, constructed with a metallic head or nozzle, and an external spiral wire or thread, whereby the pipe may be fed into the water-pipe to be thawed by means of a rotatory movement, substantially as and for the purpose set forth.

2. The combination of a crank with the externally spirally-threaded pipe, made of rubber or other flexible material, substantially as and for the purpose herein set forth.

3. The tubular supplemental crank, arranged for adjustment along the length of the flexible externally spirally-threaded pipe, substantially as and for the purpose set forth.

THOS. J. SLOAN.

Attest:
　JAMES A. WHITNEY,
　JAS. H. MATTHAEI.